United States Patent
Ren et al.

(10) Patent No.: US 11,314,393 B2
(45) Date of Patent: Apr. 26, 2022

(54) METHOD FOR PERFORMING OPERATION TO SELECT ENTRIES ON TOUCHSCREEN AND TERMINAL

(71) Applicant: Huawei Device Co., Ltd., Guangdong (CN)

(72) Inventors: Yi Ren, Shenzhen (CN); Fengbing Shi, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 0 days.

(21) Appl. No.: 16/800,548

(22) Filed: Feb. 25, 2020

(65) Prior Publication Data

US 2020/0192536 A1    Jun. 18, 2020

Related U.S. Application Data

(63) Continuation of application No. 15/707,685, filed on Sep. 18, 2017, now Pat. No. 10,599,302, which is a
(Continued)

(51) Int. Cl.
*G06F 3/0484*     (2013.01)
*G06F 3/0488*     (2013.01)
(Continued)

(52) U.S. Cl.
CPC .......... *G06F 3/0484* (2013.01); *G06F 3/0482* (2013.01); *G06F 3/0488* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| 6,639,612 | B2 | 10/2003 | Bosma et al. |
| 6,862,712 | B1 | 3/2005 | Nakagawa et al. |

(Continued)

FOREIGN PATENT DOCUMENTS

| CN | 101127983 A | 2/2008 |
| CN | 101256468 A | 9/2008 |

(Continued)

OTHER PUBLICATIONS

First Office Action (including English translation) issued in corresponding Chinese Patent Application No. 201280000171.3, dated Jun. 26, 2013, 12 pages.
(Continued)

*Primary Examiner* — Adam M Queler
*Assistant Examiner* — Haimei Jiang
(74) *Attorney, Agent, or Firm* — Conley Rose, P.C.

(57) ABSTRACT

A method for performing an operation on a touchscreen and a terminal that relates to the terminal field can implement a batch operation on multiple entries of displayed entries. A method for performing an operation on a touchscreen includes receiving a touch operation when content currently displayed on the touchscreen is a displayed entry, where the displayed entry corresponds to a data entry stored in a terminal, and performing, when a track of the touch operation of the user is a sliding track on a preset area, a preset operation on each entry that the track of the touch operation passes through, where the preset area is a part of a current operation interface.

13 Claims, 7 Drawing Sheets

Related U.S. Application Data continuation of application No. 14/262,207, filed on Apr. 25, 2014, now abandoned, which is a continuation of application No. PCT/CN2012/072006, filed on Mar. 6, 2012.

(51) Int. Cl.
*G06F 3/0482* (2013.01)
*G06F 3/04883* (2022.01)
*G06F 3/04842* (2022.01)

(56) References Cited

U.S. PATENT DOCUMENTS

| | | | |
|---|---|---|---|
| 6,901,556 B2 | 5/2005 | Bosma et al. | |
| 2003/0210282 A1* | 11/2003 | Bosma | G06F 3/0481 715/845 |
| 2004/0135817 A1* | 7/2004 | Daughtery | G06F 3/04842 715/823 |
| 2006/0132455 A1 | 6/2006 | Rimas-Ribikauskas et al. | |
| 2007/0229471 A1* | 10/2007 | Kim | G06F 3/0488 345/173 |
| 2008/0042984 A1 | 2/2008 | Lim et al. | |
| 2008/0222559 A1 | 9/2008 | Kim | |
| 2008/0250354 A1* | 10/2008 | Park | G06F 3/0482 715/845 |
| 2008/0282190 A1* | 11/2008 | Kagaya | G06F 16/48 715/794 |
| 2008/0309643 A1 | 12/2008 | Arimoto | |
| 2008/0309644 A1* | 12/2008 | Arimoto | H04N 1/00458 345/173 |
| 2009/0100382 A1 | 4/2009 | Skuratovsky | |
| 2009/0178008 A1 | 7/2009 | Herz et al. | |
| 2009/0213086 A1 | 8/2009 | Chae et al. | |
| 2009/0282332 A1* | 11/2009 | Porat | G06F 3/04883 715/702 |
| 2010/0245274 A1 | 9/2010 | Fukuda | |
| 2010/0265185 A1 | 10/2010 | Oksanen | |
| 2010/0289743 A1* | 11/2010 | Sun | G06F 3/0346 345/158 |
| 2011/0063327 A1* | 3/2011 | Shimizu | H04N 1/00453 345/660 |
| 2011/0154196 A1* | 6/2011 | Icho | G06F 16/54 715/702 |
| 2011/0185308 A1* | 7/2011 | Machida | G06F 3/0485 715/784 |
| 2011/0205163 A1* | 8/2011 | Hinckley | G06F 3/0483 345/173 |
| 2012/0030566 A1* | 2/2012 | Victor | G06F 3/04883 715/702 |
| 2012/0096400 A1* | 4/2012 | Cho | G06F 3/0482 715/810 |
| 2012/0216150 A1* | 8/2012 | Wernecke | G06F 3/01 715/850 |
| 2012/0320057 A1* | 12/2012 | Gutierrez | G06T 15/20 345/427 |
| 2012/0327098 A1 | 12/2012 | Cheng | |
| 2013/0141378 A1* | 6/2013 | Yu | G06F 3/016 345/173 |
| 2013/0227480 A1* | 8/2013 | Kim | G06F 3/0488 715/810 |
| 2014/0119673 A1* | 5/2014 | Rathnavelu | G06K 9/36 382/284 |
| 2014/0237399 A1 | 8/2014 | Ren et al. | |
| 2016/0117096 A1 | 4/2016 | Miyashita et al. | |

FOREIGN PATENT DOCUMENTS

| | | |
|---|---|---|
| CN | 101325637 A | 12/2008 |
| CN | 101617288 A | 12/2009 |
| CN | 101727282 A | 6/2010 |
| CN | 101847076 A | 9/2010 |
| CN | 101893982 A | 11/2010 |
| CN | 101943995 A | 1/2011 |
| CN | 102025902 A | 4/2011 |
| CN | 102033690 A | 4/2011 |
| CN | 102096543 A | 6/2011 |
| CN | 102117175 A | 7/2011 |
| CN | 102262507 A | 11/2011 |
| CN | 102662555 A | 9/2012 |
| CN | 103019577 A | 4/2013 |
| EP | 1416368 A2 | 5/2004 |
| JP | 2000259306 A | 9/2000 |
| JP | 2001184167 A | 7/2001 |
| JP | 2007025023 A | 2/2007 |
| JP | 2008310543 A | 12/2008 |
| JP | 2009003579 A | 1/2009 |
| JP | 2011154555 A | 8/2011 |
| KR | 20120050971 A | 5/2012 |
| WO | 2004066117 A2 | 8/2004 |
| WO | 2010134748 A2 | 11/2010 |

OTHER PUBLICATIONS

Second Office Action (including English translation) issued in corresponding Chinese Patent Application No. 201280000171.3, dated Mar. 14, 2014, 14 pages.

First Office Action (including English translation) issued in corresponding Chinese Patent Application No. 201210056739.5, dated Jul. 23, 2013, 13 pages.

Extended European Search Report issued in corresponding European Patent Application No. 12736969.2, fated Feb. 17, 2015, 9 pages.

Communication Pursuant to Article 94(3) EPC issued in corresponding European Patent No. 13757339.0, dated Jun. 6, 2017, 8 pages.

Notice of Reason(s) for Rejection (including English translation) issued in corresponding Japanese Patent Application No. 2014560235, dated Dec. 15, 2015, 11 pages.

Notice of Preliminary Rejection (including English translation) issued in corresponding Korean Patent Application No. 10-2014-7027131, dated Nov. 13, 2015, 13 pages.

Notice of Allowance (including English translation) issued in corresponding Korean Patent Application No. 10-2014-7027131, dated Jun. 28, 2016, 3 pages.

International Search Report (including English translation) issued in corresponding International Application No. PCT/CN2012/072006, dated Dec. 13, 2012, 6 pages.

International Search Report (including English translation) issued in corresponding International Application No. PCT/CN2013/072209, dated Jun. 13, 2013, 23 pages.

* cited by examiner

METHOD FOR PERFORMING OPERATION TO SELECT ENTRIES ON TOUCHSCREEN AND TERMINAL

CROSS-REFERENCE TO RELATED APPLICATIONS

This application is a continuation of U.S. patent application Ser. No. 15/707,685 filed on Sep. 18, 2017, which is a continuation of U.S. patent application Ser. No. 14/262,207 filed on Apr. 25, 2014, which is a continuation of International Patent Application No. PCT/CN2012/072006 filed on Mar. 6, 2012. All of the aforementioned applications are hereby incorporated by reference in their entireties.

TECHNICAL FIELD

The present disclosure relates to the terminal field, and in particular, to a method for performing an operation on a terminal touchscreen and a terminal.

BACKGROUND

At present, a touchscreen is widely used in terminal products such as mobile phones and tablet computers. When a user needs to perform an operation on multiple displayed entries on a display interface of a terminal device, two methods are normally available. One method is selecting multiple displayed entries on a touchscreen one by one until all required entries are selected. The other method is, when the device provides a select-all operation, directly selecting all entries. For example, when a short message service (SMS) message needs to be sent to a group of contacts in a mobile phone, the contacts need to be selected one by one until the group of contacts required by the user is selected, or all contacts are directly selected.

During the implementation of the foregoing technical solutions, the inventor finds that other approaches have at least the following problem. Much time is consumed for the user to select the displayed entries one by one, which hinders improving an operation speed and operation experience of the user; moreover, when the user does not need to select all contacts, the operation manner of directly selecting all contacts is not useful.

SUMMARY

Embodiments of the present disclosure provide a method for performing an operation on a touchscreen and a terminal, which can implement free selection and a batch operation on several entries of displayed entries, thereby improving an operation speed of a user.

To achieve the foregoing objective, the embodiments of the present disclosure use the following technical solutions.

A method for performing an operation on a touchscreen, including receiving a touch operation when content currently displayed on the touchscreen is a displayed entry, where the displayed entry corresponds to a data entry stored in a terminal; and performing, when a track of the touch operation is a sliding track on a preset area, a preset operation on each entry that the track of the touch operation passes through, where the preset area is a part of a current operation interface.

A terminal, including a user operation receiving unit, configured to receive a touch operation when content currently displayed on a touchscreen is a displayed entry, where the displayed entry corresponds to a data entry stored in the terminal; and an action unit, configured to perform, when a track of the touch operation is a sliding track on a preset area, a preset operation on each entry that the track of the touch operation passes through, where the preset area is a part of a current operation interface.

According to the method for performing an operation on a touchscreen and the terminal provided by the embodiments of the present disclosure, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operation time of the user.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
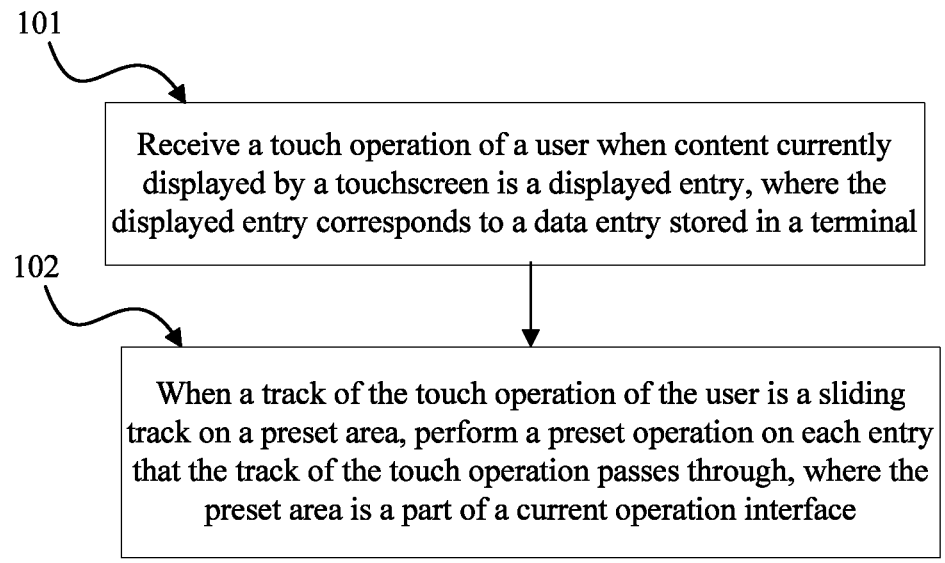
FIG. 1 is a flowchart of a method for performing an operation on a touchscreen according to Embodiment 1 of the present disclosure.

This embodiment of the present disclosure provides a method for performing an operation on a touchscreen, which, as shown in FIG. 1, includes the following steps.

101. Receive a touch operation when content currently displayed on a touchscreen is a displayed entry, where the displayed entry is data information displayed on a current interface; the displayed entry corresponds to a data entry stored in a terminal; and the touchscreen refers to a screen on which an operation may be performed by using a finger or a stylus as a touch device. It should be noted that performing an operation by a user by using a motion sensing gesture also falls within a scope defined by this embodiment of the present disclosure, which is not described in detail here for the convenience of description, and is described in detail later.

102. When a track of the touch operation is a sliding track on a preset area, perform a preset operation on each entry that the track of the touch operation passes through. The preset area is a part of a current operation interface.

If the touch operation is performed on the preset area, the terminal performs the preset operation on each entry of the displayed entries that the track of the touch operation passes through. Alternatively, the preset operation is a select operation or a deselect operation performed on the entry.

Figure 2:
FIG. 2 is a schematic diagram of a display interface of a terminal in Embodiment 1 of the present disclosure.
Figure 3:
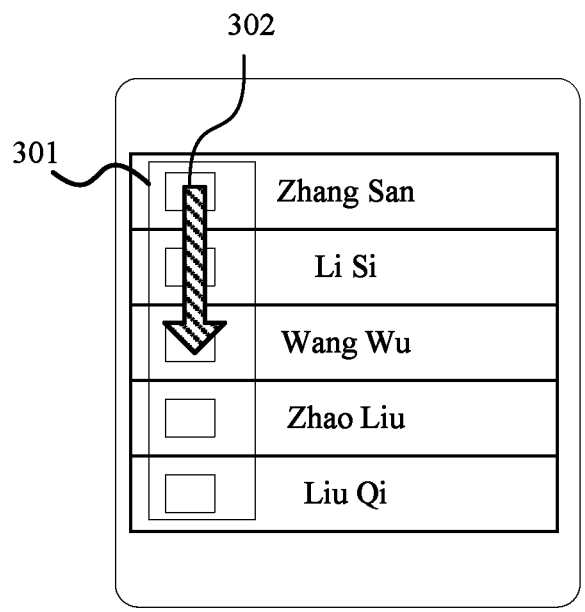
FIG. 3 is a schematic diagram showing a sliding operation performed on the basis of FIG. 2.
Figure 4:
FIG. 4 is a schematic diagram of a display interface after a sliding operation illustrated in FIG. 3 is performed.

For example, as shown in FIG. 2, entries currently displayed on a touchscreen are a contact list. In this case, a user performs a touch operation. When a track of the touch operation of the user is a sliding track on a preset area, if the touch operation 302 is performed within the preset area 301 shown in FIG. 3, a preset operation is performed on each contact entry that the track of the touch operation of the user passes through. For example, in FIG. 3, the preset operation specifically is a select operation on the contact entries. Accordingly, an effect after the selection is performed is shown in FIG. 4. If the touch operation is performed outside the preset area, displayed content is displayed after flipping, which is the same as a touchscreen display solution in other approaches and is not described herein. A scope of the preset area may be preset on the terminal and is a part of the current operation interface. The preset area may have different positions and sizes for different display interfaces and displayed entries. As shown in FIG. 3, a scope of the preset area 301 may be either a scope in which contact check boxes shown in the figure are located or another preset scope.

According to the method for performing an operation on a touchscreen provided by this embodiment of the present disclosure, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operating time of the user.

Embodiment 2

Figure 5:
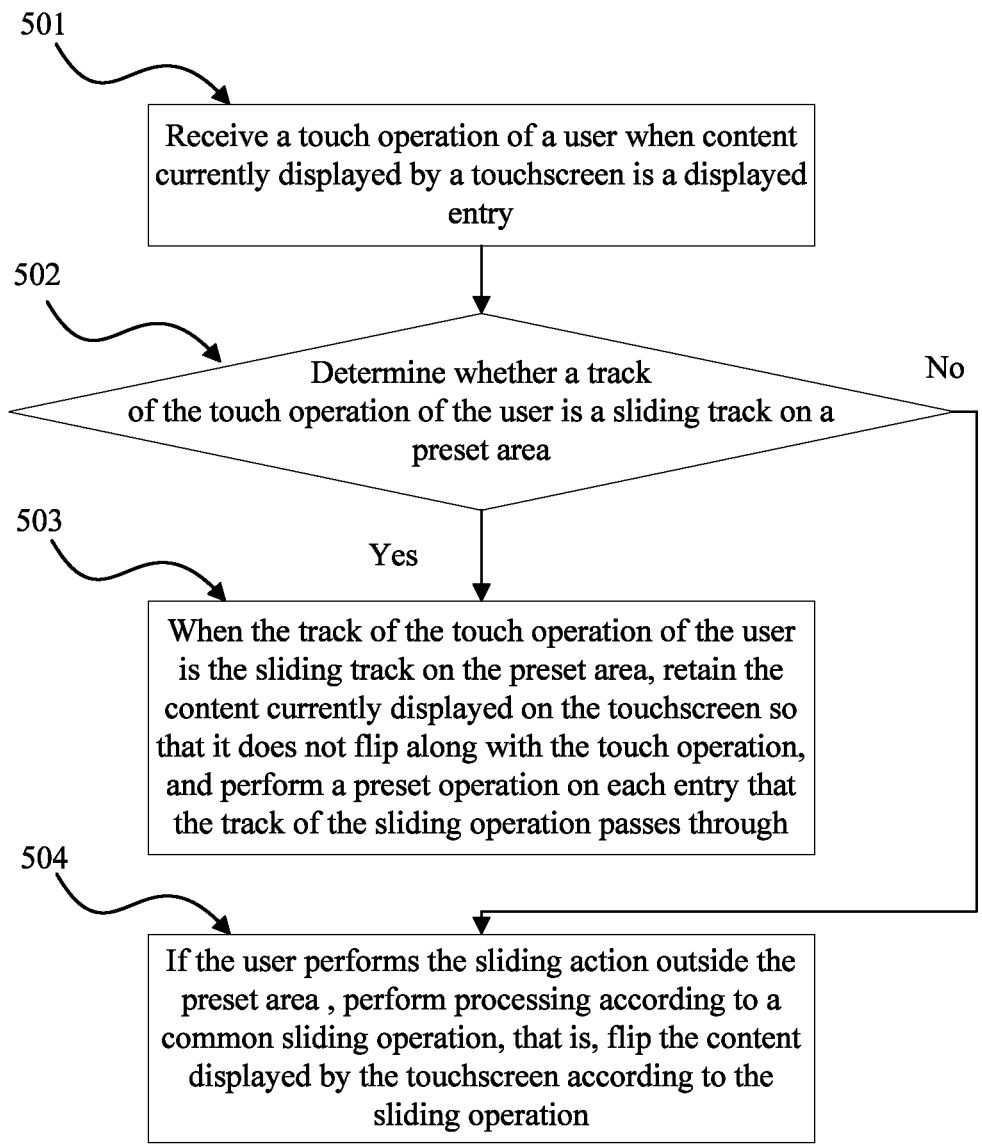
FIG. 5 is a flowchart of a method for performing an operation on a touchscreen according to Embodiment 2 of the present disclosure.

This embodiment of the present disclosure provides a method for performing an operation on a touchscreen, which, as shown in FIG. 5, includes the following steps.

501. Receive a touch operation when content currently displayed on a touchscreen is a displayed entry, where the displayed entry is data information displayed on a current interface, and the displayed entry corresponds to a data entry stored in a terminal. In one implementation manner, as shown in FIG. 3, the displayed entry is information displayed on an address book of a terminal, where each piece of information corresponds to one data entry stored in the terminal.

502. Determine whether a track of the touch operation is a sliding track on a preset area, where the preset area is a part of a current operation interface, and the current operation interface should include at least the preset area and other areas.

If a user performs a sliding operation on the preset area, continue to perform step 503; otherwise, perform step 504.

503. When the track of the touch operation of the user is the sliding track on the preset area, perform a preset operation on each entry that the track of the touch operation passes through. Alternatively, when the track of the touch operation of the user is the sliding track on the preset area, currently displayed content on the touchscreen may be retained and does not flip along with the touch operation.

Further, the preset operation of step 503 may be, when an entry that the track of the touch operation passes through is an unselected entry, performing a select operation on the entry; and when an entry that the track of the touch operation passes through is a selected entry, performing a deselect operation on the entry.

504. If the user performs the touch operation on an area outside the preset area, perform processing according to a common sliding operation. That is, content displayed on the touchscreen is flipped according to the sliding operation. Flipping mentioned in this embodiment of the present disclosure may be flipping and displaying an entire display page, or updating a part of displayed content on the display page, which is not limited in this embodiment of the present disclosure.

In addition, alternatively, when multiple entries that the track of the touch operation passes through include a selected entry and an unselected entry, the preset operation of step 503 may further be uniformly performing a select operation or a deselect operation on the multiple entries that the track of the touch operation passes through. For example, when the multiple entries that the track of the touch operation passes through include a selected entry and an unselected entry, no detection is performed on a quantity and a select operation is performed on all entries that the track of the touch operation passes through, or a deselect operation is performed on all entries that the track of the touch operation passes through.

Alternatively, when the multiple entries that the track of the touch operation passes through include a selected entry and an unselected entry, the preset operation of step 503 may further be performing a different preset operation according to a difference between the number of selected entries and the number of unselected entries. Specifically, the following steps may be included.

S1: when the multiple entries that the track of the touch operation passes through include both a selected entry and an unselected entry, detect the number of selected entries and the number of unselected entries of the multiple entries that the track of the touch operation passes through;

S2: when the number of the selected entries is not less than the number of the unselected entries of the multiple entries that the track of the touch operation passes through, perform a deselect operation on the multiple entries that the track of the touch operation passes through; or S3: when the number of the selected entries is less than the number of the deselected entries of the multiple entries that the track of the touch operation passes through, perform a select operation on the multiple entries that the track of the touch operation passes through.

Figure 6:
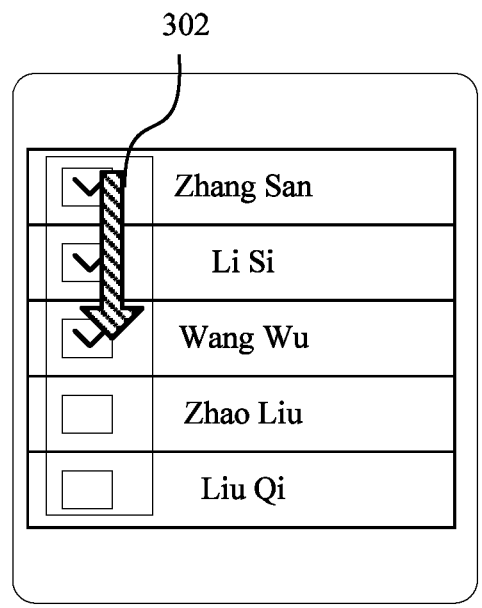
FIG. 6 is a schematic diagram showing a sliding operation performed in Embodiment 2 of the present disclosure.
Figure 7:
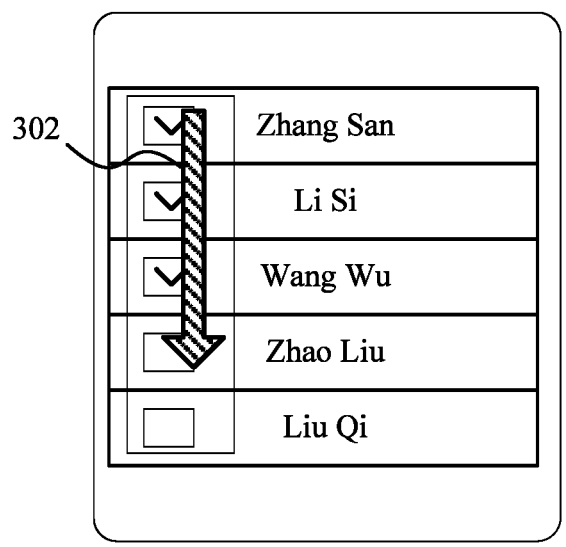
FIG. 7 is a schematic diagram showing another sliding operation performed in Embodiment 2 of the present disclosure.
Figure 8:
FIG. 8 is a schematic diagram of a display interface after a sliding operation illustrated in FIG. 7 is performed.

An example shown in FIG. 3 in which currently displayed entries on a touchscreen are a contact list is described. In this case, when a user performs a touch operation, where a track of the touch operation is a sliding track on a preset area 301, content currently displayed on the touchscreen is retained and does not flip, and a preset operation is performed on each entry of displayed entries that the touch operation of the user passes through. In FIG. 3, assume that the preset operation specifically is selecting a displayed entry; accordingly, an effect after selection is performed is shown in FIG. 4, where three entries of Zhang San, Li Si, and Wang Wu are selected. If a touch operation is performed again in a case shown in FIG. 4, and a track of the touch operation is still a sliding track on the preset area 301, as shown in FIG. 6, a track 302 of the touch operation slides and passes through the three selected entries, accordingly, the three entries are deselected and a display state returns to a case shown in FIG. 2. However, if the track 302 of the touch operation slides and passes through not only the three selected entries, as shown in FIG. 7, alternatively, a select operation or a deselect operation may be uniformly performed on the entries that the track passes through, or a select operation or a deselect may be selectively performed according to a difference between the number of selected entries and the number of deselected entries. If the select operation is performed, a display result is shown in FIG. 8.

If the touch operation is performed outside the preset area, displayed content is displayed after flipping, which is the same as a touchscreen display solution in other approaches. A scope of the preset area may be preset on the terminal and is a part of the current operation interface. The preset area may have different positions and sizes for different display interfaces and displayed entries. As shown in FIG. 3, a scope of the preset area 301 may be either a scope in which contact check boxes shown in the figure are located or another preset scope. In addition, alternatively, in a process of performing steps of this embodiment of the present disclosure, at least one of the following actions may further be performed: when the track of the touch operation of the user reaches an upper/lower edge or a left/right edge of the preset area, slide upward/downward displayed content on the touchscreen, or slide, to the left/right, displayed content on the touchscreen; and save the status of being selected or deselected of entries that the track of the touch operation passes through.

In an actual scenario, because of a difference in a terminal model or a difference in an application program, a track of a touch operation thereof may be in a left-right direction or an up-down direction. In different cases, when the track of the touch operation reaches an edge of the preset area, a flipping operation is performed and the status of being selected or deselected of entries that the track of the touch operation passes through is saved.

The reaching, by the track of the touch operation of the user, the upper/lower edge or left/right edge of the preset area may be implemented by using a method of periodically detecting a position of the track or by sending a signal to a processor when the touch operation is sensed at the edge of the screen, which is not limited in this embodiment of the present disclosure.

This embodiment of the present disclosure is described by using an example in which a displayed entry is a contact list; the displayed entry is not limited thereto in an actual scenario, and may also be an audio list, an SMS message list, and an image list, and the like. In addition, the terminal in this embodiment of the present disclosure may be an electronic device having a touchscreen, such as a mobile phone, a smart mobile terminal, and a navigator.

According to the method for performing an operation on a touchscreen provided by the embodiment of the present disclosure, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operating time of the user. Moreover, according to alternative solutions provided by Embodiment 2 of the present disclosure, it may further be implemented that when the user's sliding operation reaches an edge of the preset area, if an operation that has been performed is stored, displayed content may be flipped, thereby facilitating an actual application.

Embodiment 3

Figure 9:
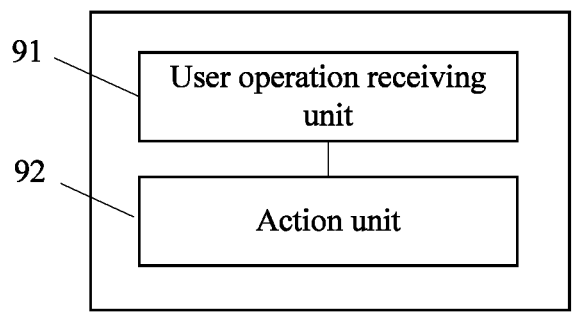
FIG. 9 is a block diagram of a terminal according to Embodiment 3 of the present disclosure.

This embodiment of the present disclosure provides a terminal. As shown in FIG. 9, the terminal includes a user operation receiving unit 91 and an action unit 92.

The user operation receiving unit 91 is configured to receive a touch operation when content currently displayed on a touchscreen is a displayed entry, where the displayed entry is data information displayed on a current interface; the displayed entry corresponds to a data entry stored in a terminal; and the touchscreen refers to a screen on which an operation may be performed by using a finger or a stylus as a touch device. It should be noted that performing an operation by a user by using a motion sensing gesture also falls within a scope defined by this embodiment of the present disclosure, which is not described in detail here for the convenience of description, and is described in detail later.

The action unit 92 is configured to perform, when a track of the touch operation is a sliding track on a preset area, a preset operation on each entry that the track of the touch operation passes through, where the preset area is a part of a current operation interface. If the touch operation is performed on the preset area, the terminal performs the preset operation on each entry of the displayed entry that the track of the touch operation passes through. Alternatively, the preset operation is a select operation or a deselect operation performed on the entry. A scope of the preset area may be preset on the terminal and is a part of the current operation interface. The preset area may have different positions and sizes for different display interfaces and displayed entries. As shown in FIG. 3, a scope of the preset area 301 may be either a scope in which contact check boxes shown in the figure are located or another preset scope.

Figure 10:
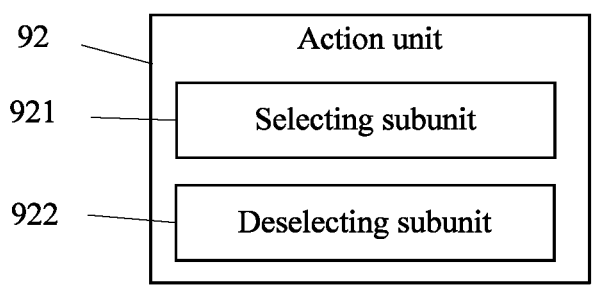
FIG. 10 is a block diagram of an action unit in Embodiment 3 of the present disclosure.

Further, as shown in FIG. 10, according to a difference in content of the preset operation, the action unit 92 may include a selecting subunit 921 and a deselecting subunit

922. The selecting subunit 921 is specifically configured to perform, when an entry that the track of the touch operation passes through is an unselected entry, a select operation on the entry; and the deselecting subunit 922 is configured to perform, when an entry that the track of the touch operation passes through is a selected entry, a deselect operation on the entry.

Figure 11:
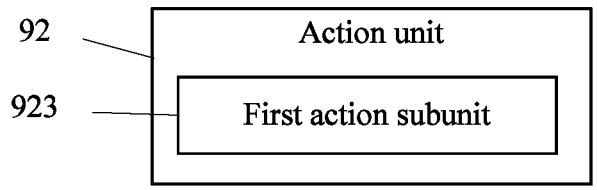
FIG. 11 is a block diagram of another action unit in Embodiment 3 of the present disclosure.

Moreover, alternatively, as shown in FIG. 11, the action unit 92 may include a first action subunit 923, configured to uniformly perform, when multiple entries that the track of the touch operation passes through include both a selected entry and an unselected entry, a select operation or a deselect operation on the multiple entries that the track of the touch operation passes through.

Figure 12:
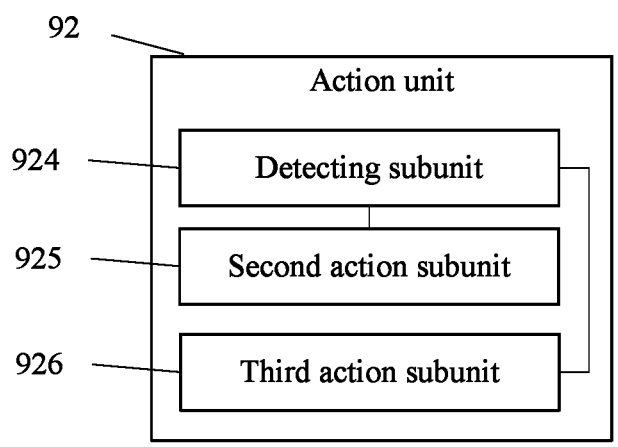
FIG. 12 is a block diagram of still another action unit in Embodiment 3 of the present disclosure.

In addition, alternatively, as shown in FIG. 12, the action unit 92 may include a detecting subunit 924, a second action subunit 925 and/or a third action subunit 926.

The detecting subunit 924 is configured to detect, when multiple entries that the track of the touch operation passes through include both a selected entry and an unselected entry, the number of selected entries and the number of deselected entries of the multiple entries that the track of the touch operation passes through.

The second action subunit 925 is configured to perform, when the number of the selected entries is not less than the number of the deselected entries of the multiple entries that the track of the touch operation passes through, a deselect operation on the multiple entries that the track of the touch operation passes through.

The third action subunit 926 is configured to perform, when the number of the selected entries is less than the number of the deselected entries of the multiple entries that the track of the touch operation passes through, a select operation on the multiple entries that the track of the touch operation passes through.

Figure 13:
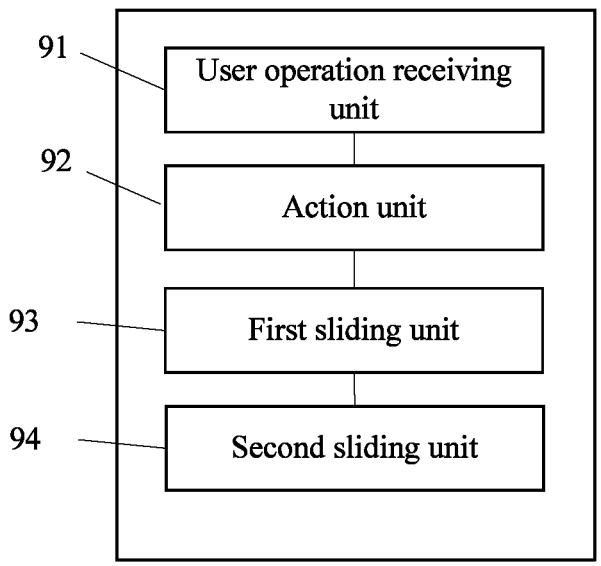
FIG. 13 is a block diagram of another terminal according to Embodiment 3 of the present disclosure.

Further, as shown in FIG. 13, the terminal may further include at least one of a first sliding subunit 93 and a second sliding subunit 94. The first sliding subunit 93 is configured to, when the track of the touch operation is the sliding track on the preset area and the track of the touch operation reaches an upper/lower edge of the preset area, flip upward/downward the content currently displayed on the touchscreen. The second sliding subunit 94 is configured to, when the track of the touch operation is the sliding track on the preset area and the track of the touch operation reaches a left/right edge of the preset area, flip, to the left/right, the content currently displayed on the touchscreen.

For the description of an operation of a touchscreen provided by the terminal according to this embodiment of the present disclosure, reference may be made to the related description of FIG. 2, FIG. 3, FIG. 4, FIG. 6, FIG. 7, and FIG. 8 in Embodiment 2, which is not described repeatedly herein.

According to the terminal in this embodiment of the present disclosure, it is detected whether a user performs a sliding operation on a preset area of a touchscreen, and when it is detected that the user performs the touch operation on the preset area, a preset operation is performed on each displayed entry that a track of the touch operation passes through, thereby avoiding an entry-by-entry operation performed by the user on displayed entries, implementing free selection and a batch operation on several entries of the displayed entries, and reducing operation time of the user. Moreover, by using alternative units of the terminal, it may further be implemented that when the touch operation reaches an edge of the preset area, in a case where an operation that has been performed is saved, displayed content may be flipped, thereby facilitating an actual application. It should be noted that the terminal according to this embodiment of the present disclosure may be an electronic device having a touchscreen, such as a mobile phone, a smart mobile terminal, and a navigator.

In addition, it should be noted that, as described in the embodiments of the present disclosure, the technical solutions described in the present disclosure are applicable not only to a touchscreen, and may also be applicable to another field, such as a motion sensing field.

Figure 14:
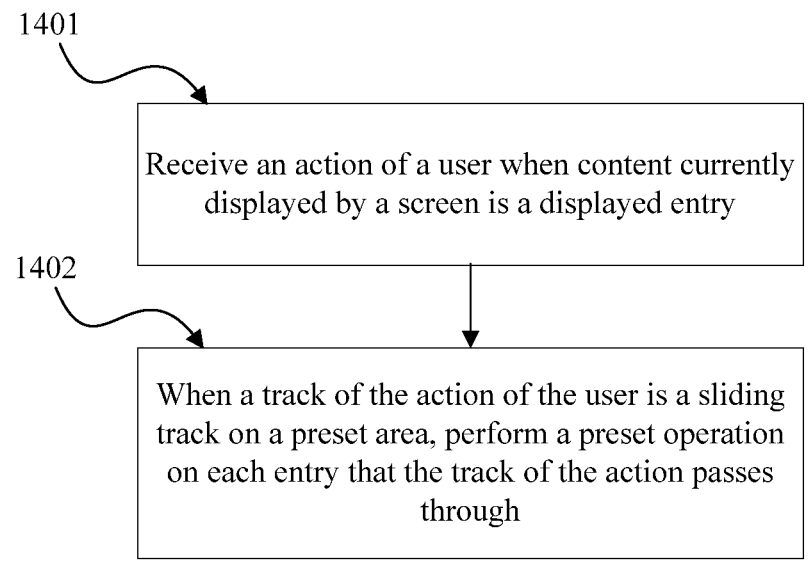
FIG. 14 is a flowchart of an operating method applicable to a motion sensing field according to an embodiment of the present disclosure.

When the technical solutions described in the embodiments of the present disclosure are applicable to the motion sensing field, as shown in FIG. 14, the method includes the following.

1401. Receive an action of a user when content currently displayed on a screen is a displayed entry, where the displayed entry corresponds to a data entry stored in a terminal.

Figure 15:
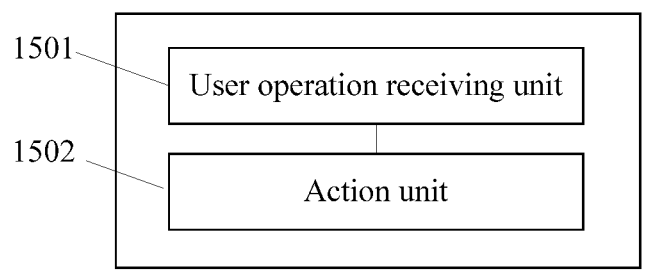
FIG. 15 is a block diagram of a terminal applicable to a motion sensing field according to an embodiment of the present disclosure.

1402. When a track of the action of the user is a sliding track on a preset area, perform a preset operation on each entry that the track of the touch operation passes through, where the preset area is a part of a current operation interface. The action of the user may be collected by using a sensor. The preset operation may be a select/deselect operation on the displayed entry. When the technical solutions described in the embodiments of the present disclosure are applicable to the motion sensing field, as shown in FIG. 15, the apparatus includes the following: a user operation receiving unit 1501, configured to receive an action of a user when content currently displayed on a screen is a displayed entry, where the displayed entry corresponds to a data entry stored in a terminal; and an action unit 1502, configured to perform, when a track of the action of the user is a sliding track on a preset area, a preset operation on each entry that the track of the touch operation passes through, where the preset area is a part of a current operation interface. The action of the user may be collected by using a sensor. The preset operation may be a select/deselect operation on the displayed entry.

A person of ordinary skill in the art may understand that all or a part of the steps of the method embodiments may be implemented by hardware or a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal, comprising:
    a touchscreen;
    a memory configured to store program code; and
    a processor coupled to the touchscreen and the memory and configured to execute the program code to:
        display on the touchscreen a first displayed entry corresponding to a first data entry stored in the terminal, a second displayed entry corresponding to a second data entry stored in the terminal, a third displayed entry corresponding to a third data entry stored in the terminal, a fourth displayed entry corresponding to a fourth data entry stored in the terminal, and a fifth displayed entry corresponding to a fifth data entry stored in the terminal;

detect a first touch operation, wherein a first track of the first touch operation starts from the first displayed entry and is a first sliding track passing through the first displayed entry, the second displayed entry, the third displayed entry, the fourth displayed entry, and the fifth displayed entry;

perform a select operation on the first displayed entry, the second displayed entry, the third displayed entry, the fourth displayed entry, and the fifth displayed entry in response to the first touch operation when, at a time when the first touch operation is detected, the first displayed entry and the fifth displayed entry are in a deselected status, and the second displayed entry, the third displayed entry, and the fourth displayed entry are in a selected status; and perform a deselect operation on the first displayed entry, the second displayed entry, the third displayed entry, the fourth displayed entry, and the fifth displayed entry in response to the first touch operation when, at a time when the first touch operation is detected, the first displayed entry and the fifth displayed entry are in the selected status, and the second displayed entry, the third displayed entry, and the fourth displayed entry are in the deselected status.

2. The terminal of claim 1, wherein the processor is further configured to execute the program code to perform the select operation or the deselect operation on each displayed entry that the first track of the first touch operation passes through in response to the first touch operation when the first track of the first touch operation passes through additional one or more displayed entries.

3. The terminal according to claim 2, wherein the processor is further configured to execute the program code to:

receive a second touch operation having a second track, wherein the second track of the second touch operation is a second sliding track passing through the first displayed entry, the second displayed entry, the third displayed entry, the fourth displayed entry, and the fifth displayed entry; and perform the select operation or the deselect operation on the first displayed entry, the second displayed entry, the third displayed entry, the fourth displayed entry, and the fifth displayed entry in response to the second touch operation.

4. The terminal according to claim 1, wherein the first track of the first touch operation reaches an edge of a preset area, and wherein the processor is further configured to execute the program code to:

flip content currently displayed on the touchscreen to display new displayed entries on the touchscreen; and save a status of being selected for any displayed entries through which the first track passes when the first track reaches the edge of the preset area.

5. The terminal of claim 4, wherein the processor is further configured to execute the program code to:

flip the content currently displayed on the touchscreen either upward or downward; and perform the select operation on each new displayed entry after flipping the content currently displayed on the touchscreen either upward or downward.

6. The terminal of claim 4, wherein the processor is further configured to execute the program code to:

flip the content currently displayed on the touchscreen either leftward or rightward; and perform the select operation on each new displayed entry after flipping the content currently displayed on the touchscreen either leftward or rightward.

7. The terminal of claim 1, wherein the first data entry, the second data entry, the third data entry, the fourth data entry, and the fifth data entry comprise images.

8. A computer program product comprising computer-executable instructions stored on a non-transitory computer-readable medium that, when executed by a processor, cause a terminal to:

display on a touchscreen a first displayed entry corresponding to a first data entry stored in the terminal, a second displayed entry corresponding to a second data entry stored in the terminal, a third displayed entry corresponding to a third data entry stored in the terminal, a fourth displayed entry corresponding to a fourth data entry stored in the terminal, and a fifth displayed entry corresponding to a fifth data entry stored in the terminal;

detect a first touch operation, wherein a first track of the first touch operation starts from the first displayed entry and is a first sliding track passing through the first displayed entry, the second displayed entry, the third displayed entry, the fourth displayed entry, and the fifth displayed entry;

perform a select operation on the first displayed entry, the second displayed entry, the third displayed entry, the fourth displayed entry, and the fifth displayed entry in response to the first touch operation when, at a time when the first touch operation is detected, the first displayed entry and the fifth displayed entry are in a deselected status, and the second displayed entry, the third displayed entry, and the fourth displayed entry are in a selected status; and perform a deselect operation on the first displayed entry, the second displayed entry, the third displayed entry, the fourth displayed entry, and the fifth displayed entry in response to the first touch operation when, at a time when the first touch operation is detected, the first displayed entry and the fifth displayed entry are in the selected status, and the second displayed entry, the third displayed entry, and the fourth displayed entry are in the deselected status.

9. The computer program product of claim 8, wherein the computer-executable instructions further cause the terminal to perform the select operation or the deselect operation on each displayed entry that the first track of the first touch operation passes through in response to the first touch operation when the first track of the first touch operation passes through additional one or more displayed entries.

10. The computer program product of claim 9, wherein the computer-executable instructions further cause the terminal to:

receive a second touch operation having a second track, wherein the second track of the second touch operation is a second sliding track passing through the first displayed entry, the second displayed entry, the third displayed entry, the fourth displayed entry, and the fifth displayed entry; and perform the select operation or the deselect operation on the first displayed entry, the second displayed entry, the third displayed entry, the fourth displayed entry, and the fifth displayed entry in response to the second touch operation.

11. The computer program product of claim 8, wherein the first track of the first touch operation reaches an edge of a preset area, and wherein the computer-executable instructions further cause the terminal to:
 flip content currently displayed on the touchscreen to display new displayed entries on the touchscreen; and
 save a status of being selected for any displayed entries through which the first track passes when the first track reaches the edge of the preset area.

12. The computer program product of claim 11, wherein the computer-executable instructions further cause the terminal to:
 flip the content currently displayed on the touchscreen either upward or downward; and
 perform the select operation on each new displayed entry after flipping the content currently displayed on the touchscreen either upward or downward.

13. The computer program product of claim 8, wherein the first data entry, the second data entry, the third data entry, and the fourth data entry comprise images.

\* \* \* \* \*

UNITED STATES PATENT AND TRADEMARK OFFICE
CERTIFICATE OF CORRECTION

PATENT NO. : 11,314,393 B2  
APPLICATION NO. : 16/800548  
DATED : April 26, 2022  
INVENTOR(S) : Yi Ren and Fengbing Shi Page 1 of 1

It is certified that error appears in the above-identified patent and that said Letters Patent is hereby corrected as shown below:

On the Title Page

Page 2, (56) References Cited, U.S. Patent Documents: "2013/0141378 A1 6/2013 Yu" should read "2013/0141378 A1 6/2013 Yumiki"

Signed and Sealed this  
Ninth Day of August, 2022

Katherine Kelly Vidal  
*Director of the United States Patent and Trademark Office*